April 14, 1931.  A. E. DOVRE  1,801,194
VEGETABLE PAN
Filed July 8, 1929
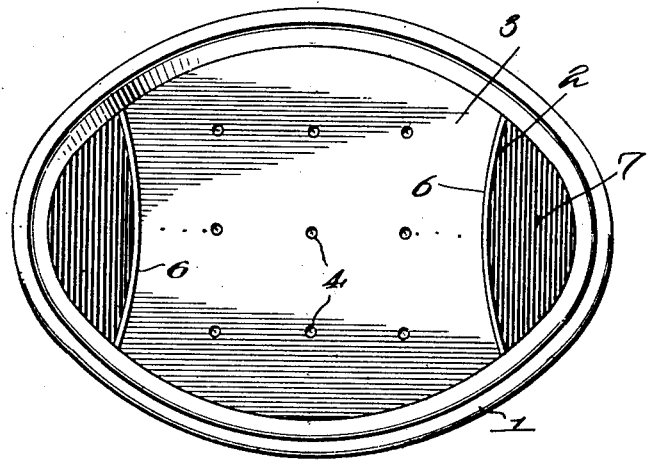
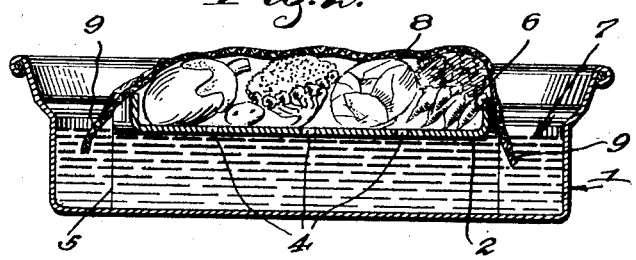
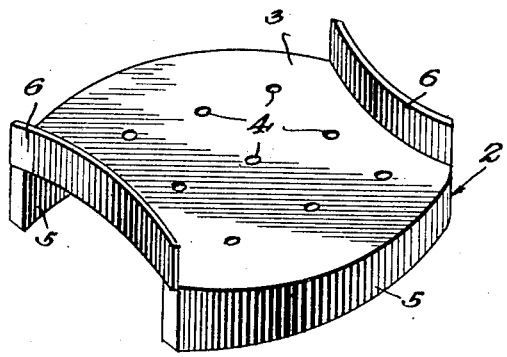
WITNESS
INVENTOR
A. E. Dovre.
BY
ATTORNEY Patented Apr. 14, 1931

1,801,194

UNITED STATES PATENT OFFICE

ANNA E. DOVRE, OF MADISON, WISCONSIN

VEGETABLE PAN

Application filed July 8, 1929. Serial No. 376,741.

My invention relates to vegetable pans and more particularly to pans wherein vegetables or fruit are kept in a fresh, moist and crisp condition, and it consists in the constructions, arrangements, and combinations herein described and claimed.

It is an object of my invention to provide a vegetable pan wherein moisture is supplied to vegetables contained therein, by capillary attraction.

A still further object of my invention is to provide a receptacle for containing water in which there is disposed a tray for support of vegetables or the like, and a cover means for the vegetables contacting with the water to distribute moisture to the vegetables, by capillary attraction.

Additional objects, advantages and features of invention will be apparent from the following description and accompanying drawings, wherein:

Figure 1 is a top plan view of my device,

Figure 2 is a longitudinal sectional view thereof, and

Figure 3 is a perspective view of the supporting tray.

In carrying out my invention I provide a pan 1 of suitable depth and preferably of an elongated form, in order to accommodate vegetables of varying lengths.

Disposed within the pan 1 there is a supporting tray 2, this tray being of a width and having a contour to snugly engage within the sides of the pan.

Reference is now made to Figure 3, wherein it will be seen that the tray is formed with a flat table surface 3, perforated, as at 4, and having downwardly extended flanges 5 along the longitudinal edges thereof. The flanges 5 may be of any suitable height but are preferably in proportion to the depth of the receptacle 1, so as to dispose the surface 3 above the water-line of the receptacle.

Each end of the tray 2 has upstanding flanges 6, which, together with the longitudinal edges of the receptacle 1, define a compartment within which vegetables or the like are deposited.

The tray 2 is of such length as to stop short of the ends of the receptacle 1 thus providing an opening 7, defined by the ends of tray 2 and end walls of the receptacle 1.

Preferably, the tray is removably supported within the receptacle, permitting ready removal thereof for cleaning or otherwise.

In the use of my device, the receptacle 1 having the tray 2 positioned therein, is filled with water to a point closely abutting the bottom of the surface 3. The vegetables, or fruits are then deposited upon the surface 3 and a moistened cloth 8 is spread over the vegetables so as to thoroughly cover them, and the projecting end portions 9 of the cloth are extended downwardly through the space 7 and into the water contained within the receptacle.

As moisture from the cloth 8 is absorbed by the vegetables or by evaporation, additional moisture will be supplied to the cloth and vegetables through contact of the end portions 9 with the water. Any surplus water which may accumulate in the tray 2 will drain back into the receptacle by virtue of the apertures 4. The apertures 4 also enhance the circulation of air through the tray and vegetables.

In certain instances, it may be desirable to provide cooling means to the vegetables or fruits, and this may be accomplished by merely depositing ice upon the cloth 8. Of course, in the event that ice is used as the cooling medium, less water will be required in the receptacle 1, since the melting ice will provide any deficiency thereof.

From the foregoing it will be seen that I have provided a receptacle which will retain vegetables or the like in a moist, crisp condition, without liability of affecting the vegetables by excessive moisture.

I claim:

1. A device of the class described comprising a liquid container, a tray to be mounted in said container above the water level thereof and having depending supports whereby the tray is mounted in the container, said tray having cut away portions with upstanding flanges along the edges thereof to form guards to retain articles placed on the tray against dropping into the container, and an absorbent cover adapted to be spread over the tray and to have its ends extend down into the liquid contained in the container.

2. In combination with a liquid container; an article supporting tray adapted to fit in said container above the water level thereof, depending flanges along the side edges of said tray to form supports therefor, the ends of the tray being cut away to terminate short of the container and having upstanding article retaining flanges, and an absorbent cover adapted to be placed over the contents of the tray and have its ends extended down into the liquid of the container.

3. In combination with a liquid container; an article supporting tray adapted to fit in said container above the water level thereof, depending flanges along the side edges of said tray to form supports therefor, the ends of the tray being cut away to terminate short of the container and having upstanding article retaining flanges, said tray having an aperture for the passage of drip water therethrough and an absorbent cover adapted to be placed over the contents of the tray and having ends extended down into the liquid in the container.

4. A device of the class described comprising a liquid container, a tray adapted to fit snugly in said container above the water level thereof, said tray having its ends cut away to leave a space between them and the container, said cut away ends having upstanding flanges to retain articles placed on the tray in operative position, and an absorbent cover adapted to extend over said tray and to have the ends thereof rest on said flanges and extend into the liquid in the container.

Mrs. ANNA E. DOVRE.